United States Patent [19]

Szydlowski

[11] 4,191,973

[45] Mar. 4, 1980

[54] SHIELDING MEANS FOR TELEVISION PICTURE TUBE ELECTRICAL FEED-THROUGH RECEPTACLES

[75] Inventor: William J. Szydlowski, Deerfield, Ill.

[73] Assignee: Zenith Radio Corporation, Glenview, Ill.

[21] Appl. No.: 927,313

[22] Filed: Jul. 24, 1978

[51] Int. Cl.[2] .............................................. H04N 5/65

[52] U.S. Cl. ................................ 358/245; 313/477 R; 313/479

[58] Field of Search ........................ 313/477, 479, 482; 358/245

[56] References Cited

U.S. PATENT DOCUMENTS 2,499,834 3/1950 Phelps .................................. 313/477

3,600,620 8/1971 Warren et al. ....................... 313/479

*Primary Examiner*—Richard Murray

*Attorney, Agent, or Firm*—Ralph E. Clarke, Jr.

[57] ABSTRACT

A television cathode ray picture tube having a glass envelope including a funnel and a faceplate generates X-radiation internally and incidental to its operation. The funnel has a wall in which is sealingly embedded open-side-out a cup-like high-voltage receptacle having an inwardly turning annular lip for detachably engaging a mating high voltage electrical connector. An improved means for enhancing the X-radiation-inhibiting characteristics of the receptacle is depicted. The improved means comprises a cover of radiation-resistant material retained against the annular lip effective to close the opening of said receptacle whereby the shielding characteristics of the receptacle are enhanced by the cover.

3 Claims, 3 Drawing Figures

Fig. 1
PRIOR ART
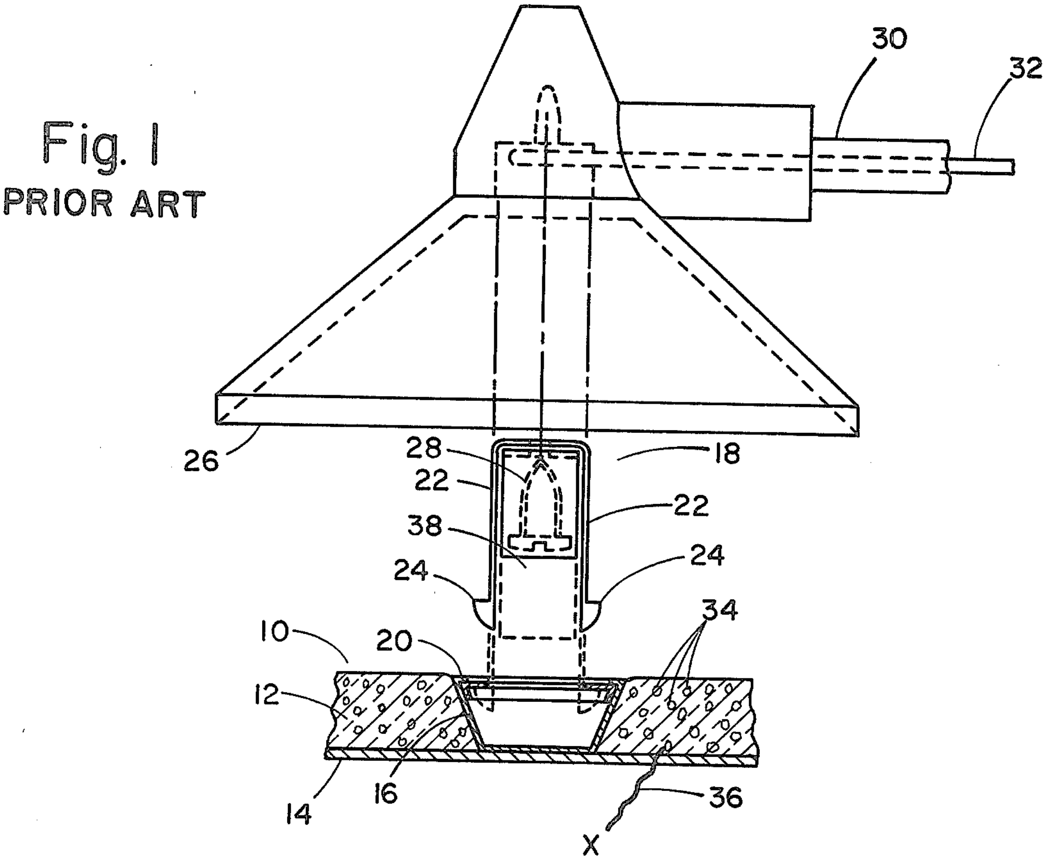
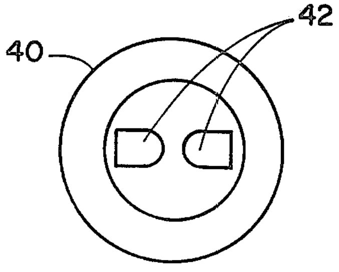
Fig. 3
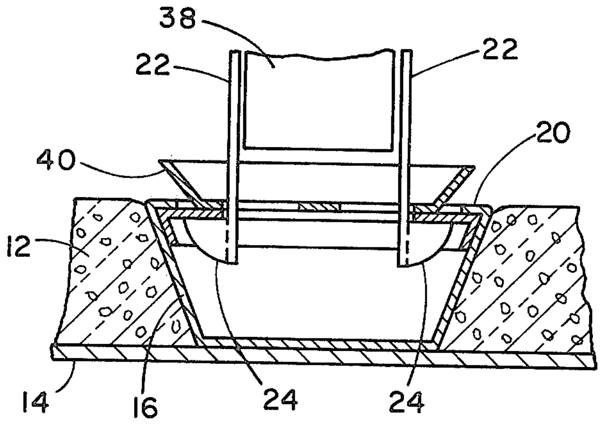
Fig. 2

SHIELDING MEANS FOR TELEVISION PICTURE TUBE ELECTRICAL FEED-THROUGH RECEPTACLES

BACKGROUND OF THE INVENTION AND PRIOR ART STATEMENT

The present invention concerns means for enhancing the X-radiation-inhibiting capability of electrical feed-through receptacles in the envelopes of television cathode ray picture tubes. It is especially concerned with such inhibiting in relation to the high-voltage anode button of such tubes.

X-radiation is generated internally incidental to tube operation and is rendered completely innocuous in television picture tubes by the shielding provided in the composition of the glass of the tube envelope. The radiation that passes through the glass of standard television cathode ray tubes normally is less than 0.05 milliroentgen/hour, which is equivalent to the average normal background radiation of the environment.

In order to bring high voltage into the interior of a picture tube, the tube envelope must be penetrated by a high voltage lead or conductor. The high voltage lead is commonly brought through the envelope by means of a high voltage receptacle or "anode button". Because the shielding intergrity of the envelope is broken at this point of high voltage transgression, special precautions may be required to assure that the X-radiation shielding effected by the anode button is adequate under all operating conditions of the tube.

Prior art means for enhancing the inhibition of X-radiation from anode buttons and other high-voltage feed-through receptacles have comprised, for example, metallic shields enclosing the area of electrical interconnection, and usually embodied in an insulative anode "cap" which forms a protective arc-suppressing enclosure when the high voltage interconnection to the receptacle is made.

Certain cathode ray picture tubes of special design, such as the post-deflection focus type tube, require the introduction of more than one high potential into the envelope of the picture tube. This potential is commonly supplied by means of a feed-through receptacle similar to the anode button, and located near or in the flange area of the faceplate. The X-radiation-inhibiting characteristics of receptacles of this type can also be enhanced by the means according to the present invention.

OBJECTS OF THE INVENTION

It is the general object of this invention to provide an improved means for enhancing X-radiation-inhibiting characteristics of electrical feed-through receptacles in cathode ray tube envelopes.

It is another general object of this invention to provide improved means to enhance X-radiation-inhibiting characteristics of the high voltage anode button of television cathode ray picture tubes.

It is a more particular object of the invention to provide means for enhancing the X-radiation-inhibiting characteristics of the anode button which can be easily installed during cathode ray tube manufacturing or servicing.

BRIEF DESCRIPTION OF THE DRAWINGS

The features of the invention which are believed to be novel are set forth with particularity in the appended claims. The invention, together with further objects and advantages thereof, may be best understood, however, by reference to the following description taken in cnjunction with the accompanying drawings, in the several figures of which like reference numerals identify like elements and in which:

FIG. 1 is a view of a fragment of a section of the funnel wall of a television cathode ray tube showing in section a typical, well-known prior art means for attaching a high-voltage connector to a high-voltage receptacle.

FIG. 2 is a view of a fragment in section of the funnel wall showing the preferred embodiment according to the invention for enhancing the X-radiation-inhibiting characteristics of high-voltage receptacles; and, FIG. 3 is a plan view of the preferred embodiment of the invention.

DESCRIPTION OF THE PREFERRED EMBODIMENT

FIG. 1 will be readily recognized by those skilled in the art as a standard means for introducing a high voltage through the funnel section of the envelope of a television cathode ray tube, wherein the invention can be advantageously employed. The section of a funnel 10 shown comprises a part of a glass envelope that includes a neck and a faceplate (not shown). Glass 12 of funnel 10 has on its inner surface an electrically conductive coating 14 which commonly comprises a thin deposit of graphite. Funnel 10 comprises a wall in which is sealingly embedded open-side-out a cup-like, high-voltage receptacle 16 which is in electrical contact with conductive coating 14. Receptacle 16 is bonded to glass 12 of funnel 10 by well-known glass-to-metal sealing means to provide an air-tight connection between the glass 12 and the receptacle 16. A high-voltage electrical connector 18 includes means for mating connector 18 with receptacle 16.

Cup-like high-voltage electrical receptacle 16—a structure which can be considered as typical of the state of the art—has an inwardly turning annular lip 20 (which includes an associated flange) for detachably engaging a mating high-voltage connector 18. In the example shown, detachable engagement of electrical connector 18 with the inwardly turning annular lip 20 of electrical receptacle 16 is provided by metal legs 22 which are spring-biased outwardly. Physical and electrical engagement of connector 18 with receptacle 16 is provided by the pressing of legs 22 inwardly during engagement then releasing the legs so that the outwardly extending feet 24 of legs 22 are captivated beneath annular lip 20 of receptacle 16, as indicated by the broken lines therebetween.

Electrical connector 18 may be attached to an anode cap 26 by screw means 28, as indicated. Anode cap 26 commonly comprises a rubber-like compound formed to enclose the area of interconnection of electrical connector 18 means and receptacle 16. The electrical path from a high-voltage power supply (not shown) to anode button 16 is completed by an insulated conductor 30 which has a metallic wire 32 therethrough for making electrical contact with connector 18, as indicated.

The associated cathode ray tube may generate X-radiation internally incidental to its operation. The glass 12 of the funnel of the cathode ray tube and of the envelope is so composed as to inhibit the passage of X-radiation, thus rendering completely innocuous such radiation by confining such radiation within the envelope of the television cathode ray tube. To enable glass 12 to provide X-radiation shielding, particles 34 of a heavy element such as lead, strontium or a combination thereof, are introduced into the composition of the glass. A quantum 36 of X-radiation is shown schematically as being stopped by heavy-element particles 34 embodied in glass 12. The emission of X-radiation from the envelope of an operating cathode ray tube is reduced to a level of, typically, less than 0.05 milliroentgen/hour at a cathode ray tube anode potential of 32 kilovolts; 0.05 milliroentgen/hour is equivalent to the average normal environmental background radiation level.

A prior art means in common use for inhibiting X-radiation emission from an anode button is shown by FIG. 1. Legs 22, in conjunction with a metal skirt 38, form an enclosure when the electrical connector 18 and anode button 16 are mated which acts to inhibit X-radiation emission from the area of anode button 16.

It may be desired to enhance the X-radiation-inhibiting characteristics of an electrical receptacle entering the tube envelope, such as a high-voltage anode button. An improved shielding means according to the invention for enhancing these characteristics of receptacle 16 is shown by FIGS. 2 and 3. The shielding means comprises a dish-like cover 40 of radiation-resistant material of substantially the same diameter as receptacle 16. Dish-like cover is retained open-side-out against annular lip 20 and is effective to close the opening of cup-like receptacle 16 to substantially enhance the shielding characteristics of receptacle 16. Cover 40 is suitably perforated, as indicated by perforations 42, for passage of legs 22. Cover 40 may be retained against annular lip 20 by the outward pressure of metal legs 22. The closure of the opening of cup-like receptacle 16 by cover 40 is effective to substantially enhance the shielding characteristics of receptacle 16.

The improved shielding means according to the invention can be easily and quickly installed or removed using simple hand tools.

Cover 40 may be comprised, for example, of one-half-hard cold-rolled steel about 18 mils thick, and formed into the preferred dish-like shape by stamping. The finish may be electro-tin plating. The diameter of the cover may be six-tenths of an inch and the heighth of the "dish" may be about one-tenth of an inch. The dimensions of the perforations 42 may be such as to be suitable for the passage of legs 22, with the actual dimensions dependent upon the particular connector design. It is to be noted that these dimensions and other values set forth herein are by no means limiting, but are intended to be exemplary only.

Although the cover 40 is shown as having a dish shape, the cover could as well comprise a flat plate or other shape convenient for fabrication as long as it provides a cover effective to close the opening of cup-like receptacle 16 and enhance the shielding characteristics of receptacle 16.

The efficacy of the shielding means according to the invention is substantiated by the fact of its application to more than one million television picture tubes a year.

Other changes may be made in the configuration, composition and dimensions of the aforedescribed shielding means without departing from the true spirit and scope of the invention herein involved and it is intended that the subject matter in the above depiction shall be interpreted as illustrative and not in a limiting sense.

I claim:

1. In a television cathode ray picture tube having a glass envelope including a funnel and a faceplate, said tube generating X-radiation internally and incidental to its operation, said envelope having a wall in which is sealingly embedded open-side-out a cup-like receptacle having an inwardly turning annular lip for detachably engaging a mating electrical connector, an improved shielding means for enhancing the X-radiation-inhibiting characteristics of said receptacle comprising a cover of radiation-resistant material retained against said annular lip in a manner effective to close the opening of said cup-like receptacle whereby the shielding characteristics of said receptacle are enhanced by said cover.

2. In a television cathode ray picture tube having a glass envelope including a funnel and faceplate, said tube generating X-radiation internally and incidental to its operation, said envelope having a wall in which is sealingly embedded open-side-out a cup-like receptacle having an inwardly turning annular lip for detachably engaging a mating high-voltage connector, an improved shielding means for enhancing the X-radiation-inhibiting characteristics of said receptacle comprising a dish-like cover of radiation-resistant material of substantially the same diameter as said receptacle and retained open-side-out against said annular lip in a manner effective to close the opening of said cup-like receptacle whereby the shielding characteristics of said receptacle are enhanced by said cover.

3. In a television cathode ray picture tube having a glass envelope including a funnel and a faceplate, said tube generating X-radiation internally and incidental to its operation, said envelope having a wall in which is embedded open-side-out a cup-like high-voltage anode receptacle having an inwardly turning annular lip for detachably engaging a mating high-voltage connector having metal legs spring-biased outwardly, said legs including feet for captivation beneath said lip, an improved shielding means for enhancing the X-radiation-inhibiting characteristics of said receptacles comprising a dish-like cover suitably perforated for the passage of said legs, said cover being comprised of a radiation-resistant material of substantially the same diameter as said receptacle and retained against said lip in a manner effective to close the opening of said cup-like receptacle whereby the shielding characteristics of said receptacle are enhanced by said cover.

* * * * *